(12) United States Patent
Mussot

(10) Patent No.: US 7,254,916 B2
(45) Date of Patent: Aug. 14, 2007

(54) LURE

(76) Inventor: Patrick Mussot, Rue de l'Avenir 3, 2855 Glovelier (CH)

(*) Notice: Subject to any disclaimer, the term of this patent is extended or adjusted under 35 U.S.C. 154(b) by 37 days.

(21) Appl. No.: 10/548,615

(22) PCT Filed: Mar. 9, 2004

(86) PCT No.: PCT/IB2004/000804

§ 371 (c)(1),
(2), (4) Date: Sep. 8, 2005

(87) PCT Pub. No.: WO2004/080168

PCT Pub. Date: Sep. 23, 2004

(65) Prior Publication Data

US 2006/0196103 A1 Sep. 7, 2006

(30) Foreign Application Priority Data

Mar. 12, 2003 (CH) .................... 0390/03

(51) Int. Cl.
*A01K 85/02* (2006.01)
*A01K 85/00* (2006.01)
(52) U.S. Cl. .............. 43/35; 43/37; 43/42.41
(58) Field of Classification Search .......... 43/34–37, 43/42.02, 42.04, 42.41, 42.44, 42.47
See application file for complete search history.

(56) References Cited

U.S. PATENT DOCUMENTS

| | | | | |
|---|---|---|---|---|
| 68,027 A | * | 8/1867 | Angilard | 43/37 |
| 768,451 A | * | 8/1904 | Hedlund | 43/35 |
| 922,879 A | * | 5/1909 | Gabrielson | 43/36 |
| 1,021,699 A | * | 3/1912 | Nordlund | 43/35 |
| 1,486,028 A | * | 3/1924 | Meighen | 43/35 |
| 1,571,770 A | * | 2/1926 | Fenner | 43/35 |
| 1,609,151 A | * | 11/1926 | Bruenig | 43/35 |
| 1,672,498 A | * | 6/1928 | Otto | 43/35 |
| 1,994,878 A | * | 3/1935 | Smith et al. | 43/35 |
| 2,571,222 A | * | 10/1951 | Dyer | 43/35 |
| 2,605,571 A | * | 8/1952 | Fasano et al. | 43/36 |
| 2,606,386 A | * | 8/1952 | Seabeck | 43/37 |

(Continued)

FOREIGN PATENT DOCUMENTS

EP 1523886 A1 * 4/2005

*Primary Examiner*—Darren W. Ark
(74) *Attorney, Agent, or Firm*—McGlew and Tuttle P.C.

(57) ABSTRACT

A lure has a body (10) provided with a recess (12), forming a decoy and defining a longitudinal axis (AA'), a connecting member (26) inserted into the body (10) via an inner end thereof, and attachable to a line (30) at the other, outer end. The point at which the connecting member is inserted into the body (10) defines the forward portion of the lure with a hook (24) positioned in the recess (12), and an attachment device (22) for securing the connecting member (26) and the hook (24) provided in the body (10). The attachment device (22) include a resilient member (23) at least indirectly attached to the body (10) at one end and to the hook (24) and the connecting member (26) at the other end, and a guide member (22*c*) for guiding the hook (24). The resulting assembly is arranged in such a way that exerting a pulling force on the connecting member (26) moves the hook (24) out of the recess (12), and the resilient member (23) pulls the hook (24) back into the recess (12) when the pulling force is no longer exerted.

6 Claims, 1 Drawing Sheet

U.S. PATENT DOCUMENTS

| | | | | |
|---|---|---|---|---|
| 2,643,479 A * | 6/1953 | Stevenson | | 43/36 |
| 2,696,060 A * | 12/1954 | Mayer | | 43/35 |
| 2,727,329 A * | 12/1955 | Robinson | | 43/35 |
| 2,884,731 A * | 5/1959 | Hodgson et al. | | 43/35 |
| 2,900,753 A * | 8/1959 | Griffith | | 43/37 |
| 3,266,185 A * | 8/1966 | Abramson, Jr. | | 43/35 |
| 3,411,233 A * | 11/1968 | Hopper | | 43/35 |
| 3,739,517 A * | 6/1973 | Schleif | | 43/35 |
| 3,778,917 A * | 12/1973 | Peippo | | 43/35 |
| 3,802,114 A * | 4/1974 | Diebold | | 43/37 |
| 3,818,626 A * | 6/1974 | Peippo | | 43/35 |
| 4,176,489 A * | 12/1979 | Levstik | | 43/35 |
| 4,442,622 A * | 4/1984 | Sartain | | 43/35 |
| 4,765,084 A * | 8/1988 | Braden | | 43/34 |
| 4,782,618 A * | 11/1988 | Rainey | | 43/35 |
| 4,980,987 A * | 1/1991 | Ramsey, Sr. | | 43/42.02 |
| 5,546,694 A * | 8/1996 | Wilkinson | | 43/42.47 |
| 6,574,907 B1 * | 6/2003 | Mitton | | 43/35 |
| 6,651,375 B2 * | 11/2003 | Parrish | | 43/35 |
| 6,711,848 B1 * | 3/2004 | Gammieri | | 43/35 |
| 6,862,836 B1 * | 3/2005 | Ridings | | 43/35 |

* cited by examiner

LURE

CROSS REFERENCE TO RELATED APPLICATIONS

This application is a United States National Phase application of International Application PCT/IB2004/000804 filed Mar. 9, 2004 and claims the benefit of priority under 35 U.S.C. § 119 of Swiss Patent Application No 0390/03 filed Mar. 12, 2003, the entire contents of which are incorporated herein by reference.

FIELD OF THE INVENTION

The present invention relates to lures, of the type used by fishermen for catching carnivorous fish, such as trout or pike, and more specifically, of the type comprising an artificial bait and a fishhook housed and retracted inside the artificial bait.

BACKGROUND OF THE INVENTION

A lure of this type is, for example, disclosed in U.S. Pat. No. 4,765,084. This lure comprises:
- a body that can have the shape of a fish, acting as artificial bait, and defining a longitudinal axis,
- a link member engaged in the body by one, inner, end thereof, and to be secured to a line via the other, outer, end, the point of engagement of the link member in the body defining the front part of the lure,
- a hook arranged in the body, and
- means for securing the link member and the hook in the body.

In this patent, the securing and link means comprise two pivoting axles, parallel to each other and perpendicular to the longitudinal axis, and two toothed sectors meshing with each other, each mounted on one of the axles and one carrying the link member and the other the hook.

The hook comprises two arms arranged in the same plane and each ending in a point.

In this lure, when the link member is aligned with the two axles of the securing means, the two points of the hook are hidden in the body of the artificial bait. This position is occupied when the fisherman has immersed the lure and moves it in the water by pulling on the line. Thus, since the hook is retracted, the risk of the lure snagging on weeds or roots is substantially reduced. When a fish bites on the lure, this results in torsion that causes one of the arms to move out of the hook, allowing it to hook the fish.

However, this solution raises some technical problems, which substantially increase the cost of the lure, without thereby guaranteeing optimum working conditions. In fact, in order to obtain a relative position of the sectors guaranteeing proper meshing conditions, the accuracy of the dimensions and the surface state of the sectors have to be of sufficient quality to ensure that the hook is mobile in relation to the body, which is difficult to achieve and especially to maintain over time. Moreover, if the fish remains in alignment with the body of the lure, the hook remains retracted.

SUMMARY OF THE INVENTION

It is an object of the present invention to propose a particularly economical solution, offering a high level of operating dependability. The lure according to the invention therefore comprises:
- a body, provided with a housing, acting as artificial bait and defining a longitudinal axis,
- a link member engaged in the body via one, inner, end thereof, and to be fixed to a line by the other, outer, end, the point of engagement of the link member in the body defining the front part of the lure,
- a hook arranged in the housing, and
- means for fixing the link member and the hook in the body.

According to the invention, the lure is characterized in that the securing means comprise a resilient member secured at least mediately to the body by one end and to the hook and the link member by the other end, and means for guiding the hook, the entire assembly being arranged such that a pull on the link member causes the hook to leave the body, while the resilient member returns the hook inside the body when pulling ceases.

The use of a resilient member cooperating with the link member is well known, for example from U.S. Pat. No. 4,176,489. The lure described therein is arranged such that the hook is released and leaves its housing when a pull on the link member exceeds a certain value. This solution raises a problem when the fish releases the lure. The hook remains outside the body of the lure and can then snag. However, in the device according to the invention, the hook is retracted inside its housing again, even when the fish releases the lure.

Advantageously, the securing means comprise first and second arms arranged along a longitudinal direction, and the guide means comprise a hinge hinging the two arms to each other about an axis perpendicular to the longitudinal axis, one of the arms being secured to the body. The resilient member comprises a spring acting on the arms to keep them, in the rest position, in proximity to each other via the end thereof arranged towards the back of the body.

Moreover, the link member is secured to the moving arm, behind the hinge. The advantage of this configuration is that a pull on the link member only has an effect after a limit value. As soon as this value is exceeded, the hook leaves its housing completely, guaranteeing optimum hooksetting conditions.

In order to guarantee good working conditions, the spring that elastically connects the two arms is advantageously of the helical type, wound around an axis that is substantially merged with the axis of the hinge. If the hinge comprises a cylindrical pin defining its pivoting axis, the spring is advantageously engaged on the pin.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
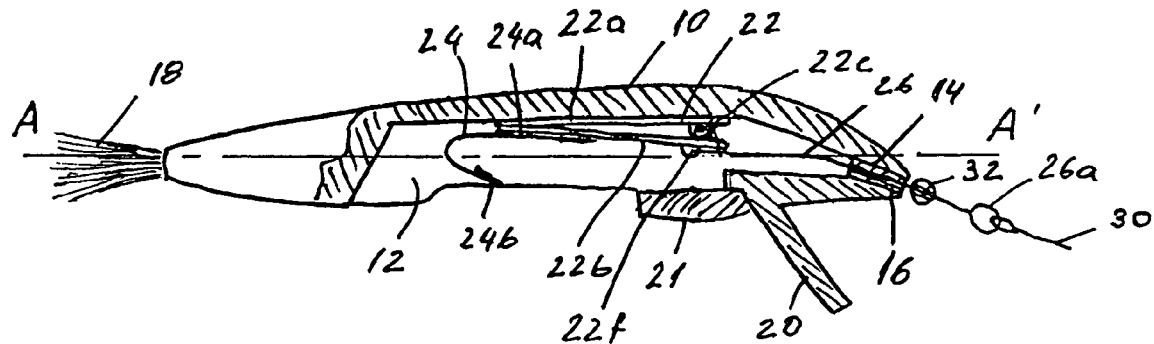
FIG. 1 is a cross sectional view of a lure according to the invention, wherein the hook is retracted.

Referring to the drawings in particular, the lure shown in the drawing comprises a body 10 of oblong shape having a longitudinal axis AA', representing a fish. It is made of wood or plastic material and comprises a housing 12 wide open towards the bottom of the body. Housing 12 is connected to the front of body 10 by a channel 14 which houses a brass tube 16.

In a conventional manner, the body is completed by a tail 18, formed for example by a coloured pompon glued to the back of body 10, and by a guide blade 20 arranged in the bottom part of the body, at the front of housing 12. At the back of blade 20 there is arranged a sinker 21 for engaging the lure in the water.

Figure 3:
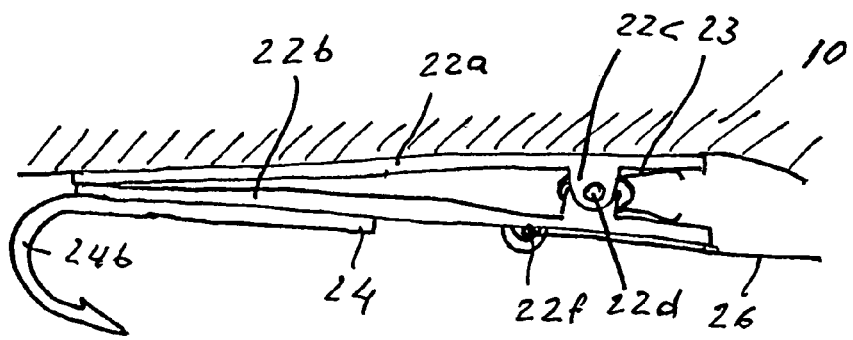
FIG. 3 is an enlarged view of the lure shown in FIGS. 1 and 2.

A small pair of pincers 22, shown in an enlarged manner in FIG. 3, are formed of two arms 22a and 22b connected to each other by a hinge 22c and a helical spring 23 engaged on a cylindrical pin 22d defining the pivoting axis of pincers 22. One of the arms 22a of the small pincers is bonded against the top wall of housing 12, the longest part of arms 22a and 22b being turned outwards. Spring 23 abuts, via one of its ends, against arm 22a secured to body 10 and via the other end against arm 22b. it is thus arranged such that the back ends of the two arms 22a and 22b are in contact with each other. The adhesive used can be of the epoxy type with two components, such as that marketed with the trademark Araldyte®.

Pincers 22 carry a hook 24 provided with a body 24a crimped to arm 22b and with two branches 24b ending in points, turned towards the exterior of housing 12, but without projecting therefrom when the lure is not stressed. A link member 26, advantageously a stainless steel wire, is secured to arm 22b at a point 22f located slightly behind hinge 22c, for example by crimping.

Link member 26 comprises, at its outer end, a bight 26a for fixing a line 30 for trailing the lure. A brass bead 32 can advantageously be arranged at the entry of tube 16.

Figure 2:
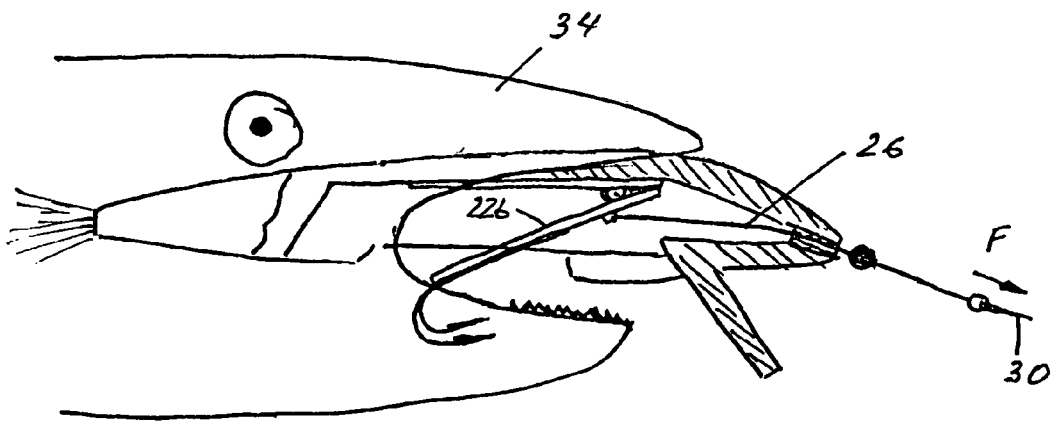
FIG. 2 is a cross sectional view of a lure according to the invention, wherein the hook is in an active position.

When a fish 34 bites the lure, as indicated in FIG. 2, the fisherman feels resistance and pulls sharply on line 30, represented by arrow F, which acts on link member 26 and on arm 22b via the point of attachment 22f. While the force is less than a limit value, depending on the winding of spring 22c and the moment arm formed by the fixing point of link member 26 to arm 22b, the latter and hook 24 that it carries, remain stationary.

When the limit value is reached, the force compensates for the effect of spring 23 which is then deformed and pincers 22 open. Since the pincers are arranged longitudinally in the housing, the moment arm defined by the distance between the hinge axis and the point of attachment 22f tends to increase as arms 22a and 22b open, such that, although the torque exerted by the spring increases, the force to be applied to move arms 22a and 22b apart remains practically constant, or even decreases. As a result, the two branches 24b of the hook abruptly leave housing 12 and engage in the fish's mouth 34, guaranteeing optimum striking conditions.

If, for one reason or another, the fish manages to release the lure, spring 22c automatically returns arms 24b inside housing 12, such that, even after a failed strike, there is no risk of the hook snagging.

Experience has shown that in order to catch freshwater fish, such as pike or trout, the force to be applied in order to make the hook come out must advantageously be comprised between 1 and 2 N.

Thus, owing to the fact that the lure according to the invention is arranged such that a pull on its link member causes the hook to leave the body of the lure, whereas, when the pulling ceases, a resilient member returns the hook inside the body, the risk of the hook snagging is practically eliminated, by extremely simple and inexpensive means.

While a specific embodiment of the invention has been shown and described in detail to illustrate the application of the principles of the invention, it will be understood that the invention may be embodied otherwise without departing from such principles.

The invention claimed is:

1. A lure comprising:
    a body, provided with a housing, acting as artificial bait and defining a longitudinal axis;
    a link member engaged in the body via one, inner, end thereof, to be fixed to a line by the other, outer, end, in a point defining the front part of the lure;
    a hook arranged in the housing; and
    means for securing the link member and the hook in the body, wherein the securing means comprises a resilient member secured at least mediately to said body by one side and to the hook and to the link member by the other side, and a member for guiding the hook, the entire assembly being arranged such that a pull on the link member causes the hook to leave the housing, said resilient member returning the hook inside the housing when the pulling ceases, said securing means including a first arm and a second arm, said member for guiding the hook including a hinge hinging said arms to each other about an axis perpendicular to the longitudinal axis, one of the arms being secured to the body along a longitudinal orientation, said resilient member including a spring acting on the arms such that the arms, in the rest position, are in proximity to each other at a point opposite the point defining the front part of the lure.

2. A lure according to claim 1, wherein said link member is secured to the one of the arms secured to the body behind the hinge.

3. A lure according to claim 2, wherein said spring is of the helical type wound around an axis substantially merged with an axis of said hinge.

4. A lure according to claim 2, wherein said hinge includes a cylindrical pin defining an axis of said hinge, said spring being engaged on said pin.

5. A lure comprising:
    a body with an interior housing region, said body having an exterior bait shape and defining a longitudinal axis and having a leading end with a channel;
    a link member comprising a first part extending from an outer end outside said body, a second part engaged through said channel and a third part disposed into said interior housing region to an inner end, said outer end being adapted to be fixed to a line;
    a hook disposed in the interior housing region and having a hook end and an interior end connected to said link member;
    a guide member for guiding the hook, said guide member being connected to said body and to said hook allowing guided movement of said hook relative to said body; and
    a resilient member acting between said body and said hook such that a pulling force on the link member above a threshold value causes said hook to leave the interior housing and said resilient member returns said hook inside said interior housing region when the pulling force on the link member above said threshold value ceases, said guide member including a hinge connected to said body and a pincer arm connected to said hook and connected to said hinge, whereby said guiding member and said pincer arm pivot about an axis perpendicular to the longitudinal axis, said resilient member including a spring acting between said arm and the body to bias said arm into a return position with said hook inside said interior housing region, said link member being secured to said arm on a hook end side of said hinge, said spring being a helical spring wound around an axis substantially coaxial with an axis of said hinge.

6. A lure according to claim 5, wherein said hinge includes a cylindrical pin defining said axis of said hinge, said spring being engaged on said pin.

\* \* \* \* \*